United States Patent [19]
Benson

[11] Patent Number: 4,872,975
[45] Date of Patent: Oct. 10, 1989

[54] SYSTEM FOR SEPARATING ABRASIVE MATERIAL FROM A FLUID USED IN FLUID JET CUTTING

[75] Inventor: Dan T. Benson, Joplin, Mo.

[73] Assignee: Ingersoll-Rand Company, Woodcliff Lake, N.J.

[21] Appl. No.: 304,084

[22] Filed: Jan. 31, 1989

[51] Int. Cl.$^4$ .................... B01D 21/26; B01D 21/34; B24C 9/00

[52] U.S. Cl. .................... 210/99; 210/104; 210/171; 210/135; 210/195.1; 210/512.3; 210/513; 51/424; 51/425

[58] Field of Search ................. 210/99, 104, 129, 171, 210/172, 512.1, 512.3, 134, 135, 195.1; 209/211; 51/424, 425; 15/3.51

[56] References Cited

U.S. PATENT DOCUMENTS 4,319,435  3/1982  Suzuki et al. .................... 51/425
4,330,968  5/1982  Kobayashi et al. .................... 51/425

FOREIGN PATENT DOCUMENTS 871434  5/1971  Canada .................... 51/425
377353  7/1932  United Kingdom .................... 210/512.3

Primary Examiner—W. Gary Jones
Assistant Examiner—Matthew O. Savage
Attorney, Agent, or Firm—James R. Bell

[57] ABSTRACT

A system for separating abrasive material from fluid used in fluid jet cutting includes a catcher tank, a settling tank and a pumping device which pumps fluid containing an abrasive material from the catcher tank and centrifugally separates an abrasive slurry from the fluid. A fluid conduit returns the fluid separated from the slurry to the cathcher tank. Another conduit directs the slurry to the settling tank where a portion of the abrasive material substantially settles from the slurry and, after settling has occurred, the slurry from which some of the abrasive material has settled is returned to the pumping device.

11 Claims, 1 Drawing Sheet

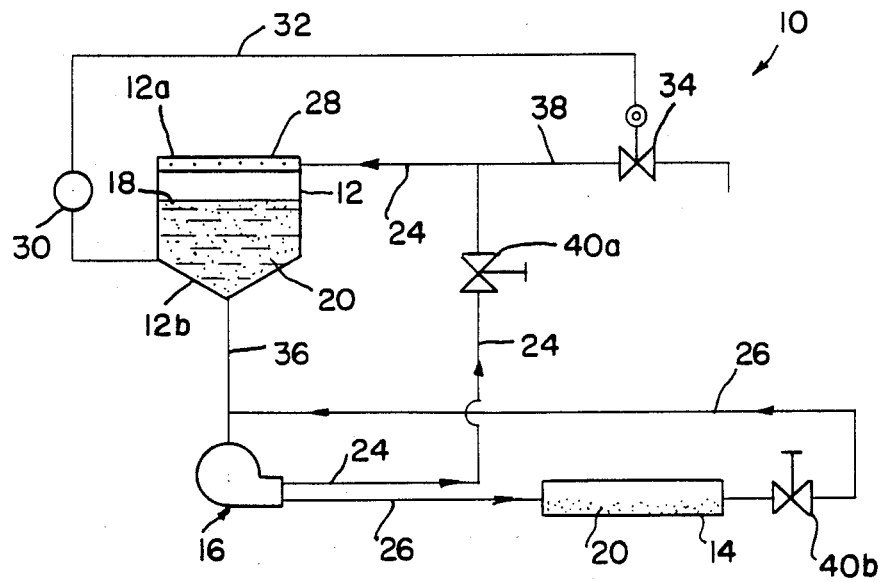
FIG. 1
FIG. 2
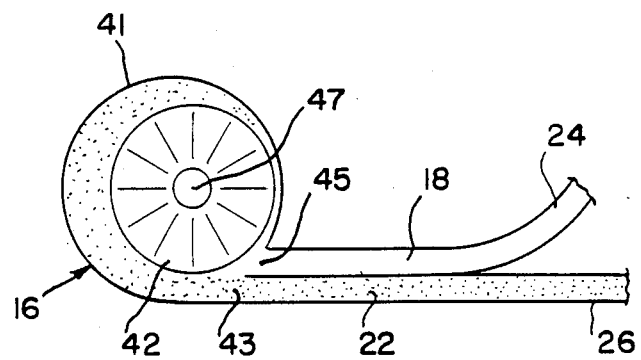

4,872,975

SYSTEM FOR SEPARATING ABRASIVE MATERIAL FROM A FLUID USED IN FLUID JET CUTTING

BACKGROUND OF THE INVENTION

This invention relates generally to cutting by use of a fluid blast, and more particularly to a high velocity fluid jet cutting system utilizing centrifugal means for separating abrasive material from the fluid after a cutting operation has occurred.

High velocity fluid jet cutting systems typically utilize a fluid such as water which is softened, boosted and intensified to elevate pressure and then piped and discharged at a very high velocity through an orifice for cutting various materials. When the materials to be cut are composites, metals and the like, an abrasive material is introduced into the jet just prior to discharge from the orifice.

Following the cutting operation, the abrasive laden water accumulates in a catcher tank and via gravity, flows therefrom to a settling tank wherein the abrasive material settles from suspension in the water. The water is then disposed of. Such a "passive" system relies on associated waterjet flow and gravity to flush the catcher tank and has an inherent limitation in that the waterjet and gravity induced flow rate from the catcher tank in the above described system is inadequate to flush or drain the tank rapidly enough resulting in a build-up of abrasive material in the bottom of the catcher tank. This build-up slows flushing of the tank even further. Eventually, the system must be shut down and the abrasive material at the bottom of the catcher tank must be shoveled out thus resulting in undesirable downtime.

The sides of the catcher tank must be sloped sufficiently to assist in draining the abrasive laden water from the catcher tank. Increasing the slope of the sides of the catcher tank to enhance drainage results in an increase in the height of the catcher tank and thus an undesirable increase in the height of the work surface where the cutting operation is being performed.

The foregoing illustrates limitations known to exist in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a system for separating abrasive material from a fluid used in fluid jet cutting comprising a catcher tank, a settling tank and a pumping device which pumps fluid containing an abrasive material suspended therein from the catcher tank and centrifugally separates an abrasive slurry from the fluid. A fluid conduit returns the fluid separated from the slurry to the catcher tank. Another conduit directs the slurry to the settling tank where a portion of the abrasive material substantially settles from the slurry and, after settling has occurred, the slurry from which some of the abrasive material has settled is returned to the pumping device.

The foregoing and other aspects will become apparent from the following detailed description of the invention when considered in conjunction with the accompanying drawing figures. It is to be expressly understood, however that the drawing figures are not intended as a definition of the invention but are for the purpose of illustration only.

BRIEF DESCRIPTION OF THE DRAWING

In the drawing:

FIG. 1 is a schematic view illustrating an embodiment of the system of the present invention; and FIG. 2 is a cross-sectional side view schematically illustrating an embodiment of the pumping means of the present invention.

DETAILED DESCRIPTION

A system for separating abrasive material from a fluid used in fluid jet cutting is generally designated 10 in FIG. 1 and includes a catcher tank 12, a settling tank 14 and a pumping means 16 for pumping fluid 18 mixed with an abrasive material 20, from the catcher tank 12 and separating an abrasive slurry 22 from the fluid 18, see also FIG. 2. A fluid conduit 24 returns the fluid 18 separated from the slurry 22 to the catcher tank 12. Another conduit 26 directs the slurry 22 to the settling tank 14 where a portion of the abrasive material 20 substantially settles from the slurry 22 and, after settling has occurred, the slurry from which some of the abrasive material 20 has settled is returned to the pumping means 16.

Abrasive material 20 introduced into fluid 18 during a fluid jet cutting operation is received in catcher tank 12 as is well known. Top portion 12a of catcher tank 12 is adjacent a work surface (not shown) where the cutting operation is being performed. A plurality of spray bars 28, only one of which is shown, provides a flushing system by introducing fluid 18 at the work surface. Sides 12b of catcher tank 12 are sloped to enhance drainage.

As the level of fluid 18 in catcher tank 12 rises, a fluid level control means 30 is preferably provided for limiting fluid 18 in catcher tank 12 to a desired level. Fluid level control means 30 is preferably a commercially available float switch.

A conduit 32 is provided to accommodate fluid level control means 30 and a dump valve 34 connected therewith. Dump valve 34 is preferably a commercially available solenoid valve controlled by float switch 30. Thus, the combination of fluid level control means 30, conduit 32 and dump valve 34 provide a means for disposing of excess fluid 18 in system 10.

Pumping means 16 is connected via a connection 36 for pumping fluid 18 and abrasive material 20 from catcher tank 12 and centrifugally separating abrasive slurry 22 from fluid 18. Pumping means 16 is a centrifugal pump and includes a diffuser housing 41 having slurry and fluid outlets 43, 45 connected respectfully to conduits 26, 24, see FIG. 2. Slurry outlet 43 is radially displaced farther from a rotational axis 47 of pumping means 16 than fluid outlet 45. The mixture of fluid 18 and abrasive material 20 from tank 12, enters pumping means 16 through conduit 36 and is provided with a uniform velocity by an impeller 42 of pumping means 16. For a given velocity, the inherently denser slurry 22 will have a greater energy, will travel radially farther than fluid 18 and subsequently exit pumping means 16 through slurry outlet 43. The lower energy fluid 18 will exit pumping means 16 through fluid outlet 45.

First conduit means 24 returns fluid 18, which has been separated from abrasive slurry 22, to catcher tank 12 via spray bars 28. A conduit 38 interconnects conduit 24 directly to pump valve 34 for the purpose of wasting excess clean fluid 18 to maintain a desired level in catcher tank 12.

Second conduit means 26 directs slurry 22, containing a highly concentrated amount of abrasive material 20 in fluid 18, to well-known settling tank 14 wherein a portion of the abrasive material 20 substantially settles from slurry 22 and, after settling has occurred, the slurry 22 from which some of the abrasive material 20 has settled, is returned to pumping means 16 via second conduit means 26.

Means such as control valves 40a and 40b are provided for regulating the flow rate of fluid 18 in system 10. Such control valves 40a and 40b are preferably commercially available gate valves. One each of the control valves 40a and 40b may be provided in conduits 24 and 26, respectively. Adjustment of control valve 40a can provide regulation of a continuous flow of fluid to spray bars 28, whereas adjustment of control valve 40b can adjust flow so as to assure that the abrasive material 20 has sufficient time to settle out of suspension in slurry 22.

The foregoing has described an "active" system 10 for performing a cleansing action by separating abrasive material 20 from fluid 18 used in fluid jet cutting rather than the heretofore known "passive" system wherein a combination of waterjet flow and gravity flow are relied upon to flush the catcher tank. This "active" system uses centrifugal pump 16 to separate abrasive material 20 from fluid 18 and to maintain an elevated flushing flow rate through the system 10. This flow rate can be further maintained or controlled by the use of flow control valves to optimize the cleansing action. The pump 16 separates flow into a fluid circuit 24 through which fluid 18 is returned to the catcher tank, and a slurry circuit 26 through which slurry 22 is directed to settling tank 14 wherein some of abrasive material 20 settles from in slurry 22 and, after settling has occurred, the slurry 22 from which the abrasive material 20 has settled is returned to pump 16.

While this invention has been illustrated and described in accordance with a preferred embodiment, it is recognized that variations and changes may be made therein without departing from the invention as set forth in the claims.

What is claimed is:

1. A system for separating abrasive material from a fluid used in fluid jet cutting, comprising:
   a catcher tank;
   a settling tank;
   means for pumping fluid, having an abrasive material suspended therein, from the catcher tank and centrifugally separating an abrasive slurry from the fluid;
   first conduit means for returning the fluid separated from the slurry to the catcher tank; and
   second conduit means for directing of the slurry to the settling tank wherein a portion of the abrasive material substantially settles from the slurry and, after settling has occurred, the slurry from which some of the abrasive material has settled is returned to the means for pumping.

2. The system as defined in claim 1, further including:
   fluid level control means for limiting fluid in the catcher tank to a desired level.

3. The system as defined in claim 2, further including:
   a dump valve connected to the fluid level control means.

4. The system as defined in claim 1, further including:
   means for regulating fluid flow rate in the first conduit means.

5. The system as defined in claim 4, further including:
   means for regulating fluid flow rate in the second conduit means.

6. In a system for separating abrasive material from a fluid used in fluid jet cutting having a catcher tank, a settling tank and interconnecting fluid conduits, the improvement comprising:
   means for pumping fluid, having an abrasive material suspended therein, from the catcher tank and centrifugally separating an abrasive slurry from the fluid;
   first conduit means for returning the fluid separated from the slurry to the catcher tank;
   second conduit means for directing the slurry to the settling tank wherein a portion of the abrasive material substantially settles from the slurry and, after settling has occurred, the slurry from which the some of the abrasive material has settled is returned to the means for pumping; and
   means for regulating fluid flow rate in the system.

7. The system as defined in claim 6, further including:
   fluid level control means for limiting fluid in the catcher tank to a desired level.

8. The system as defined in claim 7, further including:
   a dump valve connected to the fluid level control means.

9. A system for separating abrasive material from a fluid used in fluid jet cutting, comprising:
   a catcher tank;
   means for pumping fluid, having an abrasive material suspended therein, from the catcher tank and centrifugally separating an abrasive slurry from the fluid;
   first conduit means for returning the fluid separated from the slurry to the catcher tank;
   a settling tank;
   second conduit means for directing the slurry to the settling tank wherein a portion of the abrasive material substantially settles from the slurry and, after settling has occurred, the slurry from which some of the abrasive material has settled is returned to the means for pumping;
   fluid level control means for limiting fluid in the catcher tank to a desired level; and
   means for regulating fluid flow rate in the system.

10. The system as defined in claim 9, further including:
    a dump valve connected to the fluid level control means.

11. The system as defined in claim 10, wherein the means for regulating fluid flow rate in the system includes first means for regulating fluid flow rate in the first conduit means, and second means for regulating fluid flow rate in the second conduit means.

* * * * *